US009563299B2

(12) United States Patent
Atsumi

(10) Patent No.: US 9,563,299 B2
(45) Date of Patent: Feb. 7, 2017

(54) ELECTRONIC DEVICE, NON-TRANSITORY COMPUTER-READABLE RECORDING MEDIUM, AND METHOD FOR CONTROLLING ELECTRONIC DEVICE

(71) Applicant: KYOCERA Corporation, Kyoto-shi, Kyoto (JP)

(72) Inventor: Yoshihiko Atsumi, Daito (JP)

(73) Assignee: KYOCERA Corporation, Kyoto (JP)

( * ) Notice: Subject to any disclaimer, the term of this patent is extended or adjusted under 35 U.S.C. 154(b) by 51 days.

(21) Appl. No.: 14/555,481

(22) Filed: Nov. 26, 2014

(65) Prior Publication Data

US 2015/0084902 A1    Mar. 26, 2015

Related U.S. Application Data

(63) Continuation of application No. PCT/JP2013/064853, filed on May 29, 2013.

(30) Foreign Application Priority Data

May 29, 2012   (JP) .................................. 2012-122062

(51) Int. Cl.
*G06F 3/041*     (2006.01)
*H04R 17/00*     (2006.01)
(Continued)

(52) U.S. Cl.
CPC ............. *G06F 3/041* (2013.01); *G06F 1/1626* (2013.01); *G06F 1/1643* (2013.01);
(Continued)

(58) Field of Classification Search
CPC ........ G06F 3/041; G06F 3/016; G06F 1/1626; G06F 1/1684; G06F 1/1688
See application file for complete search history.

(56) References Cited

U.S. PATENT DOCUMENTS 6,266,050 B1*  7/2001  Oh ...................... G06F 3/04883
                                              178/18.01
6,518,957 B1*  2/2003  Lehtinen ............... G06F 1/1626
                                                   345/168
(Continued)

FOREIGN PATENT DOCUMENTS

JP    P2001-111661 A    4/2001
JP    2002-232542 A     8/2002
(Continued)

OTHER PUBLICATIONS

International Search Report dated Aug. 20, 2013 issued in counterpart International Application No. PCT/JP2013/064853.
(Continued)

*Primary Examiner* — Ariel Balaoing
(74) *Attorney, Agent, or Firm* — Procopio Cory Hargreaves and Savitch LLP

(57) ABSTRACT

An electronic device is provided with a display panel, a touch panel, and a piezoelectric vibration module configured to vibrate to vibrate a cover panel located on a front surface of the electronic device. The electronic device is also provided with a controller configured to control the display panel and the touch panel and vibrates the piezoelectric vibration module based on a sound signal. The controller disables a function of the touch panel when starting to vibrate the piezoelectric vibration module based on a sound signal.

11 Claims, 10 Drawing Sheets

(51) Int. Cl.
*H04M 1/03* (2006.01)
*G06F 3/01* (2006.01)
*G06F 1/16* (2006.01)
*G06F 3/16* (2006.01)

(52) U.S. Cl.
CPC .......... *G06F 1/1684* (2013.01); *G06F 1/1688* (2013.01); *G06F 3/016* (2013.01); *G06F 3/167* (2013.01); *H04M 1/03* (2013.01); *H04R 17/00* (2013.01); *H04M 2250/22* (2013.01); *H04R 2420/07* (2013.01); *H04R 2460/13* (2013.01); *H04R 2499/11* (2013.01)

(56) References Cited

U.S. PATENT DOCUMENTS

| | | | |
|---|---|---|---|
| 2008/0129703 | A1 | 6/2008 | Takeshita et al. |
| 2010/0080084 | A1* | 4/2010 | Chen ........................ G01S 11/14 367/118 |
| 2012/0052920 | A1 | 3/2012 | Kobayashi |
| 2012/0206711 | A1* | 8/2012 | Card ........................ G01S 13/04 356/5.01 |
| 2012/0238320 | A1* | 9/2012 | Kido .................... H03K 17/941 455/556.1 |
| 2012/0244917 | A1* | 9/2012 | Hosoi .................... G02C 11/06 455/575.1 |

FOREIGN PATENT DOCUMENTS

| | | |
|---|---|---|
| JP | 2004-159028 A | 6/2004 |
| JP | 2005-236352 A | 9/2005 |
| JP | 2005-348193 A | 12/2005 |
| JP | 2008-141687 A | 6/2008 |
| JP | 2010-020405 A | 1/2010 |
| JP | 2011-061316 A | 3/2011 |
| JP | 2011-166534 A | 8/2011 |
| JP | 2012-065190 A | 3/2012 |
| JP | 2012-95070 A | 5/2012 |

OTHER PUBLICATIONS

Written Opinion of International Search Authority dated Aug. 20, 2013 issued in counterpart International Application No. PCT/JP2013/064853.

Office Action dated Feb. 23, 2016 issued by the Japan Patent Office in counterpart Japanese Application No. 2012-122062.

Osamu Sonobe, "KDDI and KYOCERA Corporation, making a sample of "a new auditory smartphone" equipped with a sound vibration element", ITmedia Mobile, Japan, ITmedia, Sep. 27, 2011, [Date of Search: May 27, 2013], URL, http://www.itmedia.co.jp/mobile/articles/1109/27/news071.html.

Japanese Office Action issued Sep. 27, 2016 by Japanese Patent Office in Counterpart Japanese Application No. 2012-122062.

* cited by examiner

F I G . 5
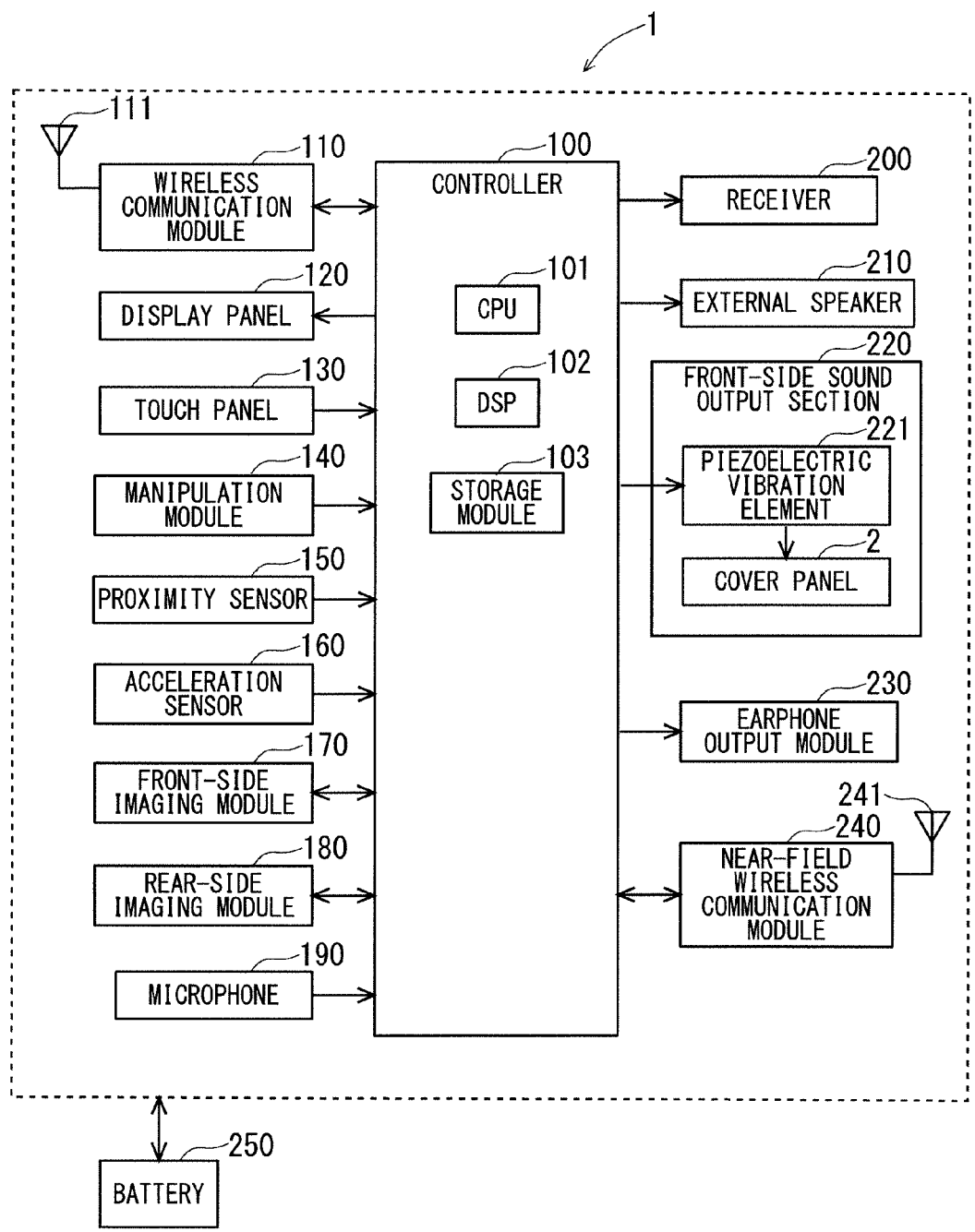

F I G . 1 2
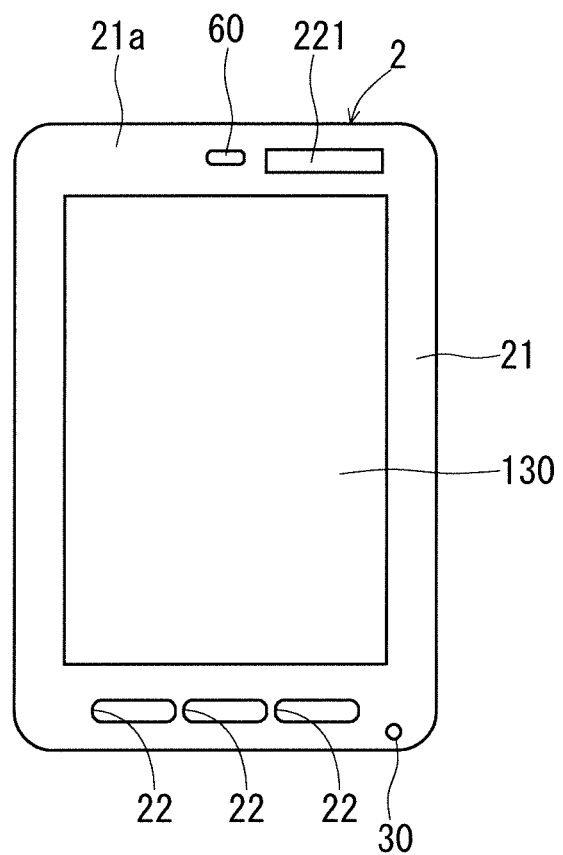

F I G . 1 3
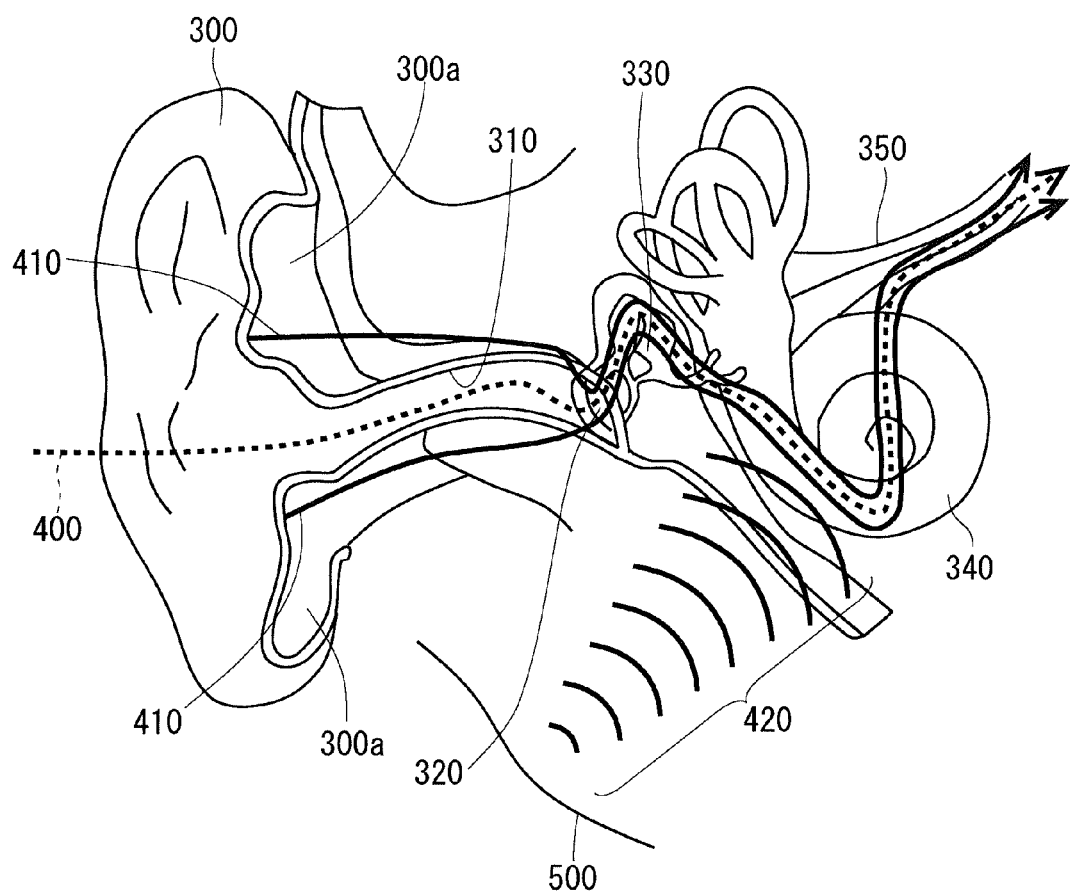

F I G. 1 4
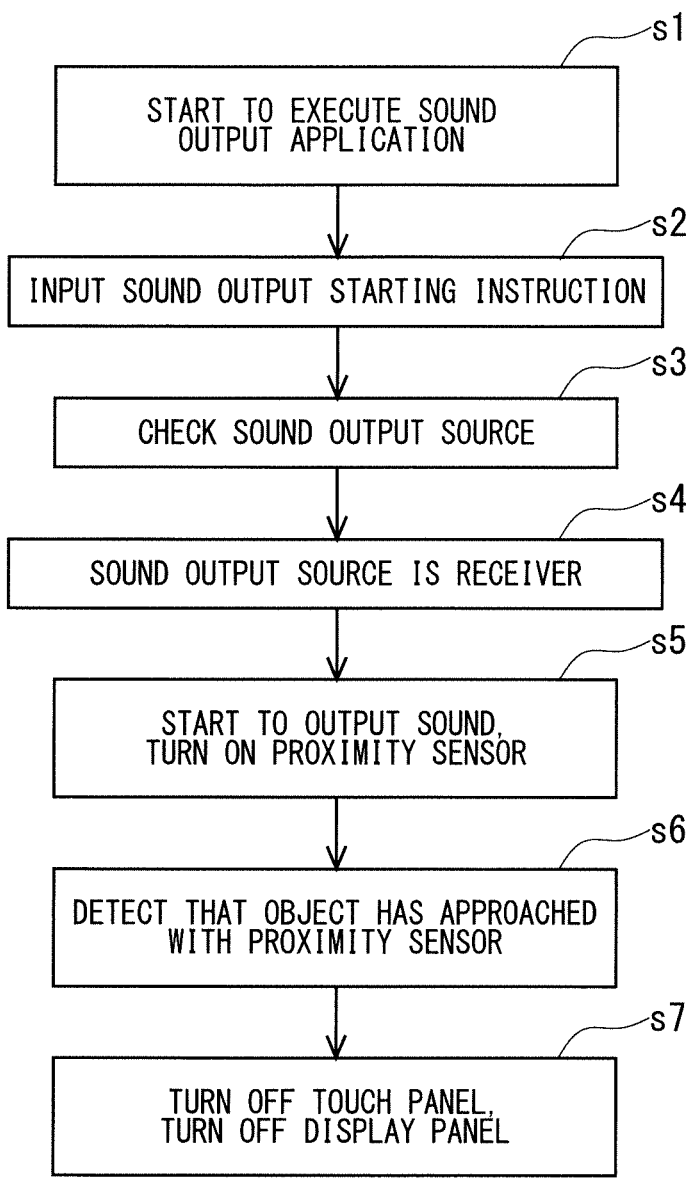

ELECTRONIC DEVICE, NON-TRANSITORY COMPUTER-READABLE RECORDING MEDIUM, AND METHOD FOR CONTROLLING ELECTRONIC DEVICE

The present application is a continuation of PCT Application No. PCT/JP2013/064853, filed May 29, 2013, which claims priority to Japanese Application No. 2012-122062, filed May 29, 2012. PCT Application No. PCT/JP2013/064853 and Japanese Application No. 2012-122062 are both entitled "ELECTRONIC DEVICE, CONTROL PROGRAM AND METHOD FOR CONTROLLING ELECTRONIC DEVICE". The content of each application is incorporated by reference herein in its entirety.

TECHNICAL FIELD

Embodiments of the present disclosure relates to an electronic device.

BACKGROUND ART

Various technologies have been conventionally proposed for electronic devices.

SUMMARY

An electronic device according to an aspect includes: a display module; a touch panel; a piezoelectric vibration module configured to vibrate to vibrate a cover panel located on a front surface of the electronic device; and a controller configured to control the display module and the touch panel, vibrates the piezoelectric vibration module based on a sound signal, and disables a function of the touch panel when starting to vibrate the piezoelectric vibration module based on a sound signal.

A non-transitory computer-readable recording medium according to an aspect, which is the recording medium configured to store a control program for controlling an electronic device including a display module, a touch panel, and a piezoelectric vibration module configured to vibrate to vibrate a cover panel located on a front surface of the electronic device, stores the control program which causes the electronic device to perform the step of disabling a function of the touch panel when starting to vibrate the piezoelectric vibration module based on a sound signal.

A control method according to an aspect, which is the method for controlling an electronic device including a display module, a touch panel, and a piezoelectric vibration module configured to vibrate to vibrate a cover panel located on a front surface of the electronic device, includes the step of disabling a function of the touch panel when starting to vibrate the piezoelectric vibration module based on a sound signal.

BRIEF DESCRIPTION OF THE DRAWINGS

FIG. 5 is a block diagram mainly showing an electrical configuration of the electronic device.

FIG. 12 is a plan view showing a cover panel viewed from an inner main surface side thereof.

FIG. 13 is a view for describing air conducted sound and conduction sound.

FIG. 14 is a flowchart showing an operation of the electronic device.

DESCRIPTION OF EMBODIMENT

<External Appearance of Electronic Device>

Figure 2:
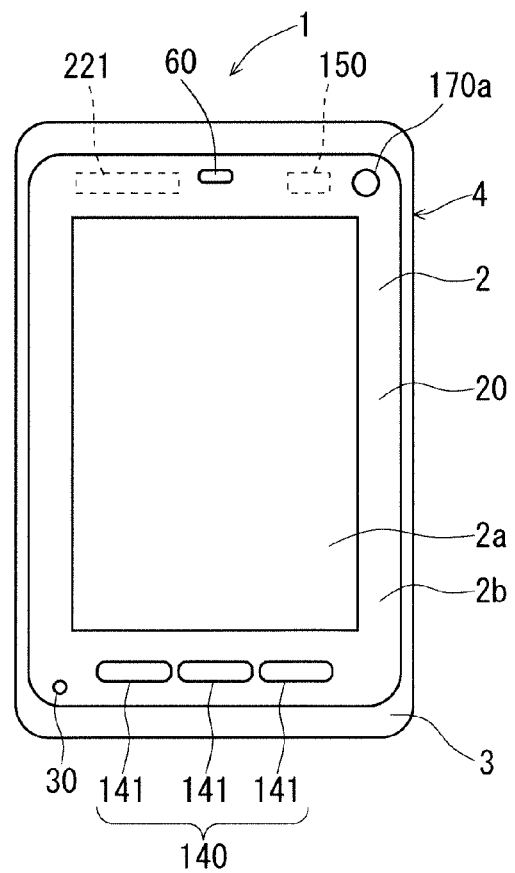
FIG. 2 is a front view showing the external appearance of the electronic device.
Figure 3:
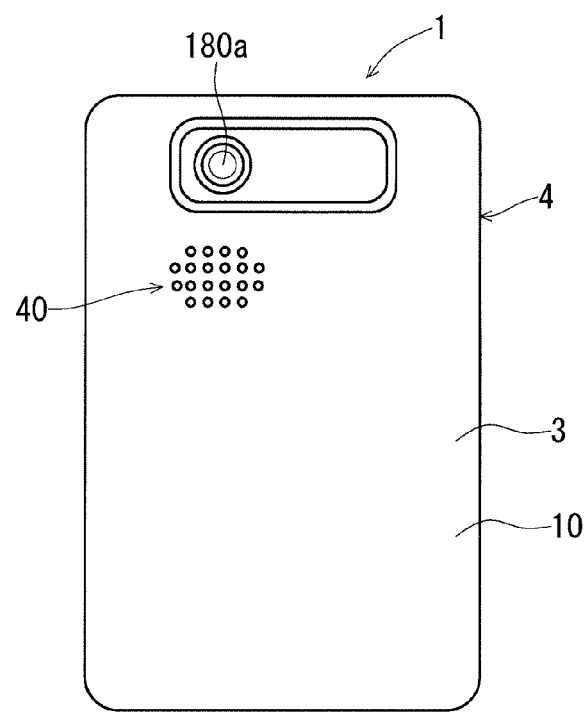
FIG. 3 is a rear view showing the external appearance of the electronic device.
Figure 4:
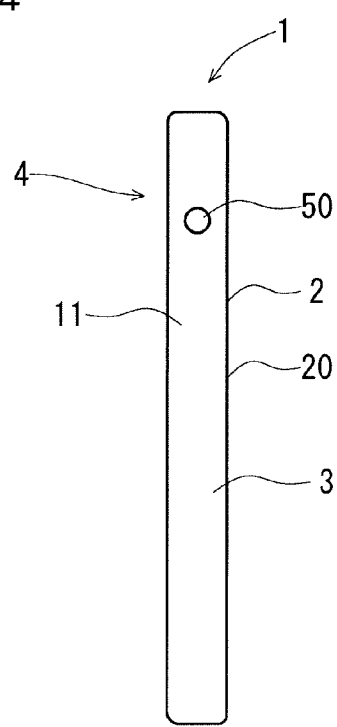
FIG. 4 is a side view showing the external appearance of the electronic device.

FIGS. 1 to 4 are a perspective view, a front view, a rear view, and a side view showing an external appearance of an electronic device 1 according to an embodiment, respectively. FIG. 4 shows the electronic device 1 when viewed from the left side of the sheet of FIG. 2. The electronic device 1 according to this embodiment is, for example, a mobile phone.

As shown in FIGS. 1 to 4, the electronic device 1 includes a cover panel 2 and a case part 3. The cover panel 2 and the case part 3 are combined to constitute a device case 4 having a plate shape substantially rectangular in plan view.

The cover panel 2 has a substantially rectangular shape in plan view. The cover panel 2 forms a part in a front part of the electronic device 1 other than a peripheral part thereof. The cover panel 2 is formed of, for example, a transparent glass or a transparent acrylic resin. The case part 3 forms the peripheral part of the front part, a lateral part, and a rear part of the electronic device 1. The case part 3 is formed of, for example, a polycarbonate resin.

The cover panel 2 is provided with a display part 2a on which various types of information such as characters, symbols, and diagrams are displayed. The display part 2a has, for example, a rectangular shape in plan view. A peripheral part 2b that surrounds the display part 2a in the cover panel 2 is black through, for example, application of a film. The peripheral part 2b accordingly serves as a non-display part on which no information is displayed. Attached to an inner main surface of the cover panel 2 is a touch panel 130, which will be described below. This allows the user to provide various instructions to the electronic device 1 by manipulating the display part 2a of the cover panel 2 with his/her finger.

Provided inside the device case 4 is a manipulation module 140 including a plurality of hardware keys 141. The surface of each hardware key 141 is exposed from a lower-side end portion of an outer main surface 20 of the cover panel 2. Although three hardware keys 141 are provided in the electronic device 1 according to this embodiment, the number of the hardware keys 141 may be appropriately changed.

Made in the lower-side end portion of the cover panel 2 is a microphone hole 30. Visible from the upper-side end portion of the outer main surface 20 of the cover panel 2 is an imaging lens 170a included in a front-side imaging module 170, which will be described below. Made in the center in the horizontal direction of the electronic device 1, at the upper-side end portion of the cover panel 2, is a receiver hole 60.

As shown in FIG. 2, provided inside the device case 4 are a piezoelectric vibration element 221 and a proximity sensor 150 described below. As shown in FIG. 3, speaker holes 40 are made in a rear surface 10 of the electronic device 1, namely, in a rear surface of the device case 4. Visible from the rear surface 10 of the electronic device 1 is an imaging lens 180a included in a rear-side imaging module 180, which will be described below. As shown in FIG. 4, an earphone terminal 50 is provided on a left lateral surface 11 of the electronic device 1 when the electronic device 1 is viewed from the cover panel 2 side.

<Electrical Configuration of Electronic Device>

FIG. 5 is a block diagram mainly showing an electrical configuration of the electronic device 1. As shown in FIG. 5, the electronic device 1 includes a controller 100, a wireless communication module 110, a display panel 120, the touch panel 130, the manipulation module 140, the proximity sensor 150, an acceleration sensor 160, the front-side imaging module 170, the rear-side imaging module 180, and a microphone 190. The electronic device 1 further includes a receiver 200, an external speaker 210, a front-side sound output module 220 configured with the piezoelectric vibration element 221 and the cover panel 2, an earphone output module 230, a near-field wireless communication module 240, and a battery 250. These components of the electronic device 1 except for the cover panel 2 are housed in the device case 4.

The controller 100 controls other components of the electronic device 1 to collectively manage the operation of the electronic device 1. The controller 100 mainly includes a CPU (central processing unit) 101, a DSP (digital signal processor) 102, and a storage module 103.

Figure 6:
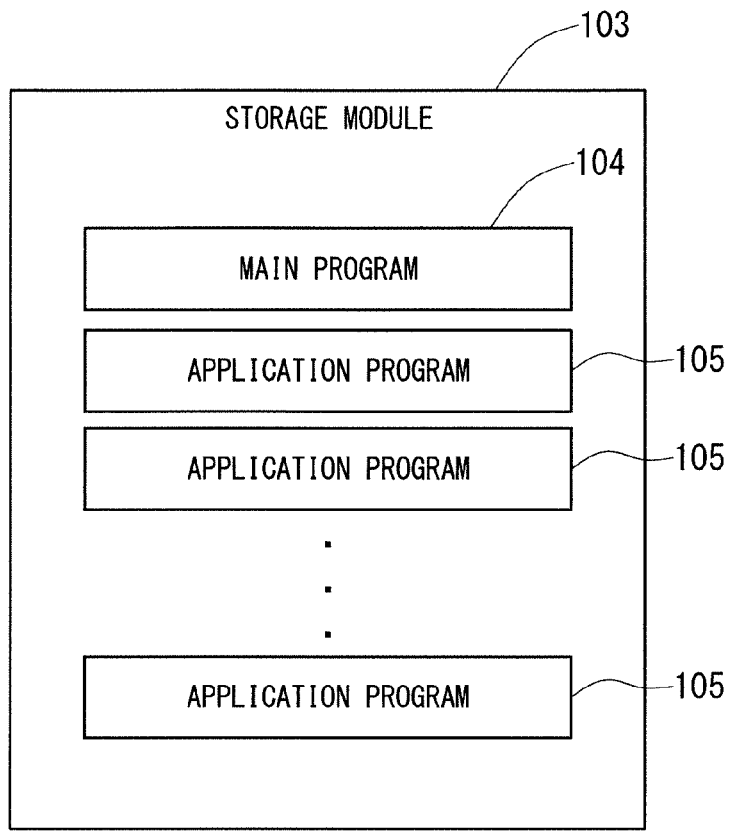
FIG. 6 is a view showing programs stored in a storage module.

The storage module 103 is configured with a non-transitory recording medium that can be read by the controller 100 (CPU 101 and DSP 102), such as a ROM (read only memory) and a RAM (random access memory). As shown in FIG. 6, the storage module 103 stores a main program 104 being a control program for controlling the operation of the electronic device 1, specifically, the components such as the wireless communication module 110 and the display panel 120 included in the electronic device 1, a plurality of application programs 105, and the like. The various functions of the controller 100 can be implemented by the CPU 101 and the DSP 102 executing the various programs in the storage module 103.

The storage module 103 may include a computer-readable, non-transitory recording medium, except for the ROM and RAM. The storage module 103 may include, for example, a small hard disk drive, a small SSD (solid state drive), and the like.

The wireless communication module 110 receives, through an antenna 111, a signal from a mobile phone different from the electronic device 1 or a communication device such as a web server connected to the Internet via a base station. The wireless communication module 110 performs amplification processing and down-conversion processing on the received signal and then outputs a resultant signal to the controller 100. The controller 100 performs modulation processing or other processing on a received signal that has been input, to thereby obtain a sound signal (sound information) indicative of voice or music contained in the received signal. Also, the wireless communication module 110 performs up-conversion processing and amplification processing on a transmission signal including the sound signal or the like that has been generated by the controller 100, to thereby wirelessly transmit the processed transmission signal from the antenna 111. The transmission signal from the antenna 111 is received, via the base station, by a mobile phone different from the electronic device 1 or a communication device connected to the Internet.

The display panel 120 is, for example, a liquid crystal display panel or an organic EL panel. The display panel 120 displays various types of information such as characters, symbols, and graphics under control of the controller 100. The information, which is to be displayed on the display panel 120, is displayed in the display part 2a of the cover panel 2 to be visible to the user of the electronic device 1.

The touch panel 130 is, for example, a projected capacitive type touch panel. The touch panel 130 detects the contact of an object with the display part 2a of the cover panel 2. The touch panel 130 is bonded to the inner main surface of the cover panel 2 and includes two sheet-like electrode sensors disposed to face each other. The two electrode sensors are bonded together with a transparent adhesive sheet.

Formed in one of the electrode sensors are a plurality of elongated X electrodes that extend in the X-axis direction (for example, the horizontal direction of the electronic device 1) and are disposed parallel to one another. Formed in the other electrode sensor are a plurality of elongated Y electrodes that extend in the Y-axis direction (for example, the vertical direction of the electronic device 1) and are disposed parallel to one another. When the user's finger or the like comes into contact with the display part 2a of the cover panel 2, a capacitance between the X electrode and the Y electrode located below the contact portion changes, so that the touch panel 130 detects the manipulation on (contact with) the display part 2a of the cover panel 2. A change in the capacitance between the X electrode and the Y electrode, which occurs in the touch panel 130, is transmitted to the controller 100. The controller 100 identifies, based on the capacitance change, the description of the manipulation made on the display part 2a of the cover panel 2, and performs the operation corresponding to the identified description.

For each of the plurality of hardware keys 141, when the user presses a hardware key 141, the manipulation module 140 outputs to the controller 100 a manipulation signal indicating that the hardware key 141 has been pressed. The controller 100 identifies, based on the input manipulation signal, which hardware key 141 of the plurality of hardware keys 141 has been manipulated and then performs the operation corresponding to the hardware key 141 that has been manipulated.

The proximity sensor 150 is, for example, an infrared proximity sensor. The proximity sensor 150 outputs a detection signal when an object approaches the proximity sensor 150 within a predetermined distance. The detection signal is input to the controller 100. When the electronic device 1 is viewed from the cover panel 2 side (front side), as shown in FIG. 2, the proximity sensor 150 is located on the rear side of the upper-side end portion of the cover panel 2. Thus, when an object such as the human head approaches the receiver hole 60, the proximity sensor 150 outputs a detection signal. The sensor-sensing distance of the proximity sensor 150 is, for example, from several millimeters to several tens of millimeters.

The acceleration sensor 160 is, for example, a three-axis acceleration sensor. The acceleration sensor 160 detects, for each of the three detection axes perpendicular to one another, the acceleration along each detection axis and then outputs the detected acceleration to the controller 100.

Figure 1:
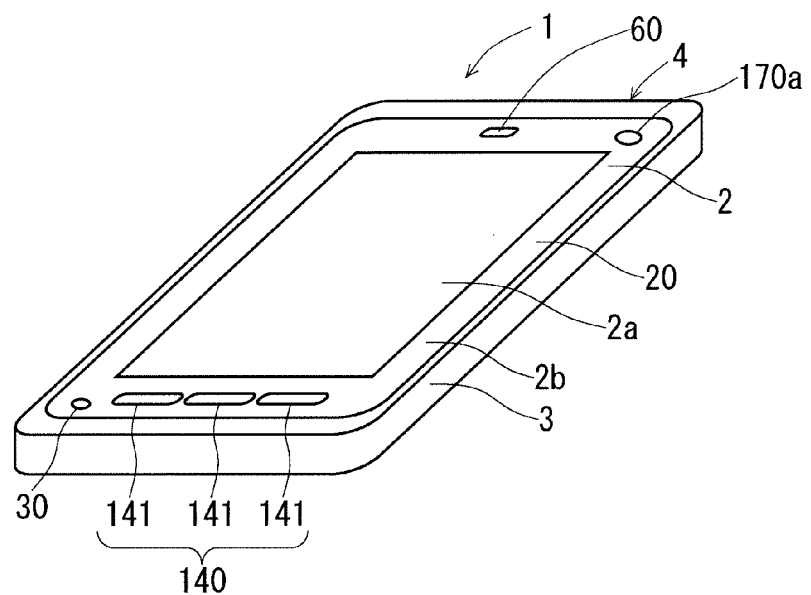
FIG. 1 is a perspective view showing an external appearance of an electronic device.

The front-side imaging module 170 is configured with the imaging lens 170a, an imaging element, and the like. The front-side imaging module 170 takes a still image and a moving image under the control of the controller 100. As shown in FIGS. 1 and 2, the imaging lens 170a is disposed to be visible from the front surface of the electronic device 1, and thus, the front-side imaging module 170 can take an image of the object located on the front side (cover panel 2 side) of the electronic device 1.

The rear-side imaging module 180 is configured with the imaging lens 180a, an imaging element, and the like. The rear-side imaging module 180 takes a still image and a moving image under the control of the controller 100. As shown in FIG. 3, the imaging lens 180a is disposed to be visible from the rear surface 10 of the electronic device 1, and thus, the rear-side imaging module 180 can take an image of the object located on the rear surface 10 side of the electronic device 1.

The microphone 190 converts the sound input from the outside of the electronic device 1 into an electrical sound signal and then outputs the electrical sound signal to the controller 100. The sound from the outside of the electronic device 1 is taken inside the electronic device 1 through the microphone hole 30 provided in the front surface of the cover panel 2 to be input to the microphone 190. The microphone hole 30 may be provided in the lateral surface of the electronic device 1 or may be provided in the rear surface 10.

The receiver 200 is, for example, a dynamic speaker, and then outputs the received sound. The receiver 200 converts an electrical sound signal from the controller 100 into sound and then outputs the sound. The sound output from the receiver 200 is output to the outside through the receiver hole 60 provided in the front surface of the electronic device 1. The sound output through the receiver hole 60 is set large enough for the user to hear when he/she brings his/her ear near the receiver hole 60.

The external speaker 210 is, for example, a dynamic speaker, and converts an electrical sound signal from the controller 100 into sound and then outputs the sound. The sound output from the external speaker 210 is output to the outside through the speaker hole 40 provided in the rear surface 10 of the electronic device 1. The sound output through the speaker hole 40 is set to a volume large enough to be heard in the place apart from the electronic device 1. The volume of the sound output through the speaker hole 40 is set to be larger than the volume of the sound output through the receiver hole 60.

The front-side sound output module 220 transmits the received sound to the user from the front surface of the electronic device 1, specifically, from the cover panel 2. The front-side sound output module 220 is configured with the piezoelectric vibration element 221 and the cover panel 2. Similarly to the sound output through the receiver hole 60, the sound output from the cover panel 2 of the front-side sound output module 220 is set to a volume large enough for the user to hear when he/she brings his/her ear near the cover panel 2.

The piezoelectric vibration element 221 is provided on the inner main surface of the cover panel 2. The piezoelectric vibration element 221 is vibrated by the drive voltage applied from the controller 100. The controller 100 generates a drive voltage based on a sound signal, and then applies the drive voltage to the piezoelectric vibration element 221. The piezoelectric vibration element 221 is vibrated based on a sound signal by the controller 100, whereby the cover panel 2 vibrates based on the sound signal. As a result, the received sound is transmitted to the user from the cover panel 2. The front-side sound output module 220 will be described below in detail.

The earphone output module 230 outputs the sound to an earphone connected to the earphone terminal 50. To be specific, the earphone output module 230 converts an electrical sound signal output from the controller 100 into a sound signal suitable for the earphone, and then outputs the converted electrical sound signal to the earphone terminal 50. This allows the sound to be output through the earphone connected to the earphone terminal 50.

The near-field wireless communication module 240 performs near-field wireless communication with a wireless communication device by Bluetooth (registered trademark). The communication distance of the near-field wireless communication module 240 is, for example, from several meters to several tens of meters. The near-field wireless communication module 240 performs amplification processing and down-conversion processing on a received signal received by the antenna 241 and then outputs the received signal to the controller 100. The controller 100 performs modulation processing or other processing on the received signal input, thereby obtaining the information contained in the received signal. The near-field wireless communication module 240 performs up-conversion processing and amplification processing on the transmission signal generated by the controller 100 and then wirelessly transmits the processed transmission signal from the antenna 241.

The electronic device 1 according to this embodiment can output the sound from the near-field wireless communication module 240. The near-field wireless communication module 240 transmits, from the antenna 241, a sound signal including the sound such as music or voice, which has been generated in controller 100. The sound signal is received by a sound output device capable of near-field wireless communication with the near-field wireless communication module 240, such as a headphone or a loudspeaker. The sound output device outputs the sound included in the received sound signal to the outside.

As described above, the electronic device 1 according to this embodiment is provided with the receiver 200, the external speaker 210, the front-side sound output module 220, the earphone output module 230, and the near-field wireless communication module 240 as a sound output source, namely, as sound output means.

The battery 250 outputs a power supply for the electronic device 1. The power supply output from the battery 250 is supplied to the electronic components included in the controller 100, the wireless communication module 110, and the like included in the electronic device 1.

The storage module 103 stores various application programs 105 (hereinafter, merely referred to as "applications 105"). The storage module 103 stores, for example, a voice conversation application for voice conversation, a videophone application for videophone communication being one type of conversation, a browser for displaying a website, a mail application for creating, browsing, transmitting, and receiving an email, an application for displaying the still image data stored in the storage module 103, and a music playback application for playing back the music data stored in the storage module 103.

Also, the storage module 103 stores a moving image playback application (hereinafter, referred to as "stored moving image playback application") for playing back the sound data and moving image data (moving image data with sound) that are associated with each other and are stored in the storage module 103, and a moving image playback application (hereinafter, referred to as "delivered moving image playback application") for playing back the moving image data with sound delivered from a website by, for example, streaming or progressive downloading. Examples of the moving image data with sound in the storage module 103 include the moving image data with sound obtained by recording the news program, English conversation program, and other program to be televised and the moving image data with sound obtained by taking a moving image with a camcorder.

Also, the storage module 103 stores a market application for downloading an application from a webserver that offers applications for a fee or for free, a game application for playing games such as a puzzle game in the electronic device 1, and a voice recorder application for recording and playing back the sound input from the microphone 190.

The controller 100 executing the main program 104 reads and executes the application 105 in the storage module 103, so that the controller 100 controls the other components in the electronic device 1, such as the wireless communication module 110, the display panel 120, and the front-side sound output module 220. As a result, the electronic device 1 performs the function corresponding to the application 105 being executed.

For example, in the case where the front-side sound output module 220 is set as the voice output source, the controller 100 executing the voice conversation application controls the wireless communication module 110, the front-side sound output module 220, and the microphone 190. As a result, in the electronic device 1, the voice included in the received signal received by the wireless communication module 110 is output from the front-side sound output module 220 and also a transmission signal including the voice input to the microphone 190 is transmitted from the wireless communication module 110. In other words, the electronic device 1 and the communication partner device perform voice conversation.

In the case where the receiver 200 is set as the voice output source, the controller 100 executing the voice conversation application controls the wireless communication module 110, the receiver 200, and the microphone 190. As a result, in the electronic device 1, the voice included in the received signal received by the wireless communication module 110 is output from the receiver 200 and also a transmission signal including the voice input to the microphone 190 is transmitted from the wireless communication module 110.

In the case where the external speaker 210 is set as the voice output source, the controller 100 executing the voice conversation application controls the wireless communication module 110, the external speaker 210, and the microphone 190. As a result, in the electronic device 1, the voice included in the received signal received by the wireless communication module 110 is output from the external speaker 210 and also a transmission signal including the voice input to the microphone 190 is transmitted from the wireless communication module 110.

In the case where the earphone output module 230 is set as the voice output source, the controller 100 executing the voice conversation application controls the wireless communication module 110, the earphone output module 230, and the microphone 190. As a result, in the electronic device 1, the voice included in the received signal received by the wireless communication module 110 is input to an earphone connected to the earphone terminal 50 through the earphone output module 230 and is then output from the earphone. Further, the transmission signal including the voice input to the microphone 190 is transmitted from the wireless communication module 110.

In the case where the near-field wireless communication module 240 is set as the voice output source, the controller 100 executing the voice conversation application controls the wireless communication module 110, the near-field wireless communication module 240, and the microphone 190. As a result, in the electronic device 1, the voice included in the received signal received by the wireless communication module 110 is input to the sound output device such as a headphone through the near-field wireless communication module 240, and is then output from the sound output device. Further, the transmission signal including the voice input to the microphone 190 is transmitted from the wireless communication module 110.

In the case where the external speaker 210 is set as the voice output source, the controller 100 executing the videophone application controls the wireless communication module 110, the display panel 120, the front-side imaging module 170, the external speaker 210, and the microphone 190. As a result, in the electronic device 1, the moving image included in the moving image data with sound received by the wireless communication module 110 is displayed on the display panel 120, and the voice included in this moving image data with sound is output from the external speaker 210. Further, the transmission signal including the voice input to the microphone 190 and the moving image taken by the front-side imaging module 170 is transmitted from the wireless communication module 110. In this manner, the electronic device 1 and the communication partner device perform videophone communication.

In the case where the earphone output module 230 is set as the sound output source, the controller 100 executing the delivered moving image playback application controls the wireless communication module 110, the display panel 120, and the earphone output module 230. As a result, in the electronic device 1, the display panel 120 displays the moving image, received by the wireless communication module 110, which is included in the moving image data with sound delivered by the communication partner device by, for example, streaming. Further, the sound included in the moving image data with sound is input to an earphone through the earphone output module 230 and is then output from the earphone. As a result, the moving image data with sound is played back.

In the case where the receiver 200 is set as the sound output source, the controller 100 executing the voice recorder application controls the receiver 200 in playing back the recorded sound. As a result, in the electronic device 1, the receiver 200 outputs the sound included in the recorded data stored in the storage module 103. In other words, the recorded sound is played back.

Hereinafter, the applications which allow the sound to be output during its execution are generically referred to as "sound output applications," such as the voice conversation application, the videophone application, the music playback application, the stored moving image playback application, the delivered moving image playback application, and the voice recorder application. It can be said that the electronic device 1 is executing the sound output function while the controller 100 is executing the sound output application.

<Details of Piezoelectric Vibration Element>

Figure 7:
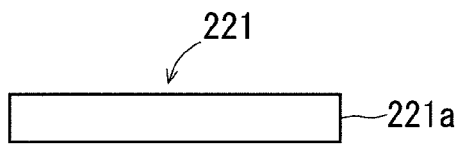
FIG. 7 is a top view showing a structure of a piezoelectric vibration element.
Figure 8:
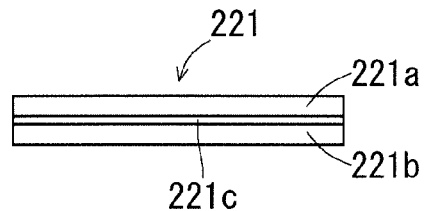
FIG. 8 is a side view showing the structure of the piezoelectric vibration element.

FIGS. 7 and 8 are a top view and a side view showing the structure of the piezoelectric vibration element 221, respectively. As shown in FIGS. 7 and 8, the piezoelectric vibration element 221 is long in one direction. To be specific, the piezoelectric vibration element 221 has an elongated plate shape rectangular in plan view. The piezoelectric vibration element 221 has, for example, a bimorph structure. The piezoelectric vibration element 221 includes a first piezoelectric ceramic plate 221a and a second piezoelectric ceramic plate 221b bonded to each other with a shim material 221c therebetween.

In the piezoelectric vibration element 221, a positive voltage is applied to the first piezoelectric ceramic plate 221a and a negative voltage is applied to the second piezoelectric ceramic plate 221b, so that the first piezoelectric ceramic plate 221a expands in the long-side direction and the second piezoelectric ceramic plate 55b contracts in the long-side direction. This causes, as shown in FIG. 9, the piezoelectric vibration element 221 to flex toward the first piezoelectric ceramic plate 221a in a convex manner.

In the piezoelectric vibration element 221, meanwhile, a negative voltage is applied to the first piezoelectric ceramic plate 221a and a positive voltage is applied to the second piezoelectric ceramic plate 221b, so that the first piezoelectric ceramic plate 221a contracts in the long-side direction and the second piezoelectric ceramic plate 221b expands in the long-side direction. This causes, as shown in FIG. 10, the piezoelectric vibration element 221 to flex toward the second piezoelectric ceramic plate 221b in a convex manner.

Figure 9:
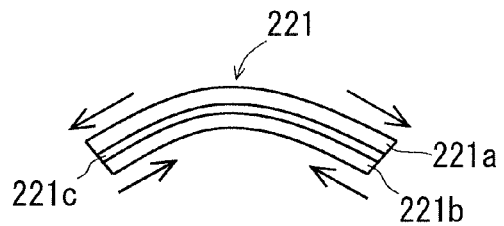
FIG. 9 is a view showing a state where the piezoelectric vibration element produces flexural vibrations.
Figure 10:
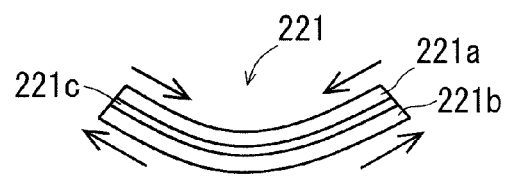
FIG. 10 is another view showing the state where the piezoelectric vibration element produces flexural vibrations.

The piezoelectric vibration element 221 alternately enters the state of FIG. 9 and the state of FIG. 10, to thereby produce flexural vibrations. The controller 100 causes an AC voltage, which alternates between positive and negative voltages, to be applied between the first piezoelectric ceramic plate 221a and the second piezoelectric ceramic plate 221b, causing the piezoelectric vibration element 221 to produce flexural vibrations.

While the piezoelectric vibration element 221 shown in FIGS. 7 to 10 is provided with a single structure configured with the first piezoelectric ceramic plate 221a and the second piezoelectric ceramic plate 221b that are bonded with the shim material 221c sandwiched therebetween, a plurality of the above-mentioned structures may be laminated.

<Position at which Piezoelectric Vibration Element is Disposed>

Figure 11:
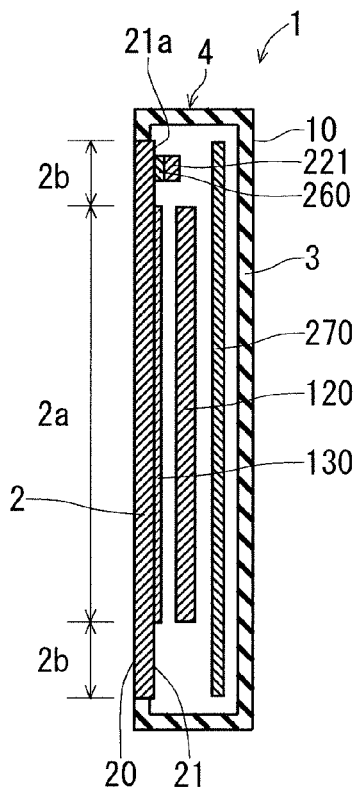
FIG. 11 is a view showing a vertical cross-sectional structure of the electronic device.

FIG. 11 is a view showing the cross-sectional structure in the vertical direction (long-side direction) of the electronic device 1. FIG. 12 is a plan view of the cover panel 2 when viewed from its inner main surface 21 side.

As shown in FIGS. 11 and 12, the touch panel 130 is bonded to the inner main surface 21 of the cover panel 2 so as to face the display part 2a of the cover panel 2. The display panel 120 being a display module is disposed to face the cover panel 2 and the touch panel 130. The touch panel 130 is thus located between the cover panel 2 and the display panel 120. The part of the cover panel 2, which faces the display panel 120, serves as the display part 2a.

Provided inside the device case 4 is a printed circuit board 270 on which various components such as the CPU 101 and the DSP 102 are mounted. The printed circuit board 270 is disposed to face the display panel 120 on the side closer to the rear surface 10 of the electronic device 1 than the display panel 120. As shown in FIG. 12, a plurality of holes 22 for respectively exposing the plurality of hardware keys 141 are made in the lower-side end portion of the cover panel 2.

The piezoelectric vibration element 221 is bonded to the inner main surface 21 of the cover panel 2 with an adhesive 260 such as a double-sided tape. The piezoelectric vibration element 221 is disposed, on the inner main surface 21 of the cover panel 2, at a position at which the piezoelectric vibration element 221 does not overlap the display panel 120 and the touch panel 130 in plan view of the cover panel 2 viewed from the inner main surface 21 side. In other words, when the cover panel 2 is viewed from the inner main surface 21 side in the thickness direction of the cover panel 2, the piezoelectric vibration element 221 is disposed, on the inner main surface 21, at a position at which the piezoelectric vibration element 221 does not overlap the display panel 120 and the touch panel 130. Therefore, the touch panel 130 and the display panel 120 are not located between the cover panel 2 and the piezoelectric vibration element 221. The piezoelectric vibration element 221 is provided on the upper-side end portion 21a of the inner main surface 21 of the cover panel 2 so as to be located near the receiver hole 60. The piezoelectric vibration element 221 is disposed such that its long-side direction coincides with the horizontal direction of the cover panel 2.

In the case where the touch panel 130 is located over the entire inner main surface 21 of the cover panel 2, the piezoelectric vibration element 221 may be disposed on the inner main surface 21 of the cover panel 2 with the touch panel 130 therebetween.

<Generation of Received Sound by Front-Side Sound Output Module>

In the front-side sound output module 220 according to this embodiment, the piezoelectric vibration element 221 causes the cover panel 2 to vibrate, so that air conducted sound and conduction sound are transmitted to the user from the cover panel 2. In other words, the vibrations of the piezoelectric vibration element 221 itself are transmitted to the cover panel 2, allowing for the transmission of air conducted sound and conduction sound to the user from the cover panel 2.

Herein, the air conducted sound is the sound recognized by the human brain when a sound wave (air vibrations), which has entered the external auditory meatus (so-called "earhole"), causes the eardrum to vibrate. Meanwhile, the conduction sound is the sound recognized by the human brain when the auricle is vibrated and vibrations of the auricle are transmitted to the eardrum, which causes the eardrum to vibrate. The air conducted sound and conduction sound will now be described in detail.

FIG. 13 is a view for describing the air conducted sound and conduction sound. FIG. 13 shows the structure of the user's ear of the electronic device 1. In FIG. 13, a dashed line 400 indicates a conductive path of a sound signal (sound information) when the air conducted sound is recognized by the brain, and a solid line 410 indicates a conductive path of a sound signal when the conduction sound is recognized by the brain.

When the piezoelectric vibration element 221 mounted on the cover panel 2 is vibrated based on an electrical sound signal indicative of received sound, the cover panel 2 vibrates, whereby a sound wave is output from the cover panel 2. When the user has the electronic device 1 in his/her hand and brings the cover panel 2 of the electronic device 1 near an auricle 300 of the user or holds the cover panel 2 of the electronic device 1 to (brings the cover panel 2 of the electronic device 1 into contact with) the auricle 300 of the user, the sound wave output from the cover panel 2 enters an external auditory meatus 310. The sound wave from the cover panel 2 travels through the external auditory meatus 310 and causes an eardrum 320 to vibrate. The vibrations of the eardrum 320 are transmitted to an auditory ossicle 330, causing the auditory ossicle 330 to vibrate. Then, the vibrations of the auditory ossicle 330 are transmitted to a cochlea 340 and are then converted into an electrical signal in the cochlea 340. The electrical signal is transmitted to the brain through an auditory nerve 350, so that the brain recognizes the received sound. In this manner, the air conducted sound is transmitted from the cover panel 2 to the user.

When the user has the electronic device 1 in his/her hand and holds the cover panel 2 of the electronic device 1 to the auricle 300 of the user, the auricle 300 is vibrated by the cover panel 2 vibrated by the piezoelectric vibration element 221. The vibrations of the auricle 300 are transmitted to the eardrum 320, causing the eardrum 320 to vibrate. The vibrations of the eardrum 320 are transmitted to the auditory ossicle 330, causing the auditory ossicle 330 to vibrate. The vibrations of the auditory ossicle 330 are then transmitted to the cochlea 340 and are then converted into an electrical signal by the cochlea 340. The electrical signal is transmitted to the brain through the auditory nerve 350, whereby the brain recognizes the received sound. In this manner, the conduction sound is transmitted from the cover panel 2 to the user. FIG. 13 also shows an auricular cartilage 300*a* inside the auricle 300.

Bone-conducted sound is the sound recognized by the human brain when the skull is vibrated and the vibrations of the skull directly stimulate the inner ear such as the cochlea. In FIG. 13, showing the case in which, for example, a mandibular bone 500 is vibrated, a plurality of arcs 420 indicate a transmission path of a sound signal when the bone conduction sound is recognized by the brain.

As described above, in the front-side sound output module 220 according to this embodiment, the piezoelectric vibration element 221 appropriately vibrates the cover panel 2 on the front surface, so that the air conducted sound and conduction sound can be transmitted from the cover panel 2 to the user of the electronic device 1. The user can hear the air conducted sound from the cover panel 2 by bringing his/her ear (auricle) to the cover panel 2. The user can also hear the air conducted sound and conduction sound from the cover panel 2 by bringing his/her ear (auricle) into contact with the cover panel 2. The structure of the piezoelectric vibration element 221 according to this embodiment is contrived to appropriately transmit the air conducted sound and conduction sound to the user. Various advantages can be achieved by configuring the electronic device 1 to transmit the air conducted sound and conduction sound to the user.

For example, the user can hear the sound by bringing the cover panel 2 near or into contact with his/her ear, and thus can have a telephone conversation without much consideration of the position where the user brings his/her ear near or into contact with the electronic device 1.

For large ambient noise, the user can make it difficult to hear the ambient noise by putting his/her ear strongly to the cover panel 2 while turning up the volume of the conduction sound. This enables the user to appropriately have a telephone conversation even if the ambient noise is large.

Even while wearing earplugs or earphones in his/her ears, the user can recognize the received sound from the electronic device 1 by holding the cover panel 2 to his/her ear (more specifically, auricle). Alternatively, even while wearing headphone in his/her ears, the user can recognize the received sound from the electronic device 1 by holding the cover panel 2 to the headphones.

While a clearance is provided between the touch panel 130 and the display panel 120 in the above-mentioned example as shown in FIG. 11, the touch panel 130 and the display panel 120 may be brought into contact with each other. A clearance, provided between the touch panel 130 and the display panel 120 as in this embodiment, can prevent the cover panel 2 from hitting the display panel 120 (more accurately, the touch panel 130 from hitting the display panel 120) even if the cover panel 2 flexes toward the display panel 120 by being pressed by the user with, for example, his/her finger. This prevents a display of the display panel 120 from being disturbed by the cover panel 2 hitting the display panel 120.

<On/Off Control of Touch Panel During Sound Output>

While the electronic device 1 is outputting the sound from the receiver 200, the user normally brings his/her ear to the receiver hole 60 to listen to the sound through the receiver hole 60. On this occasion, the ear, cheek, or the like of the user may come into contact with the display module 2*a* of the cover panel 2 and the touch panel 130 may detect the contact. This may result in a malfunction of the electronic device 1.

In the electronic device 1 according to this embodiment, therefore, in the output of the sound from the receiver 200, the function of the touch panel 130 is turned off, namely, the function of the touch panel 130 is disabled when the proximity sensor 150 located near the receiver hole 60 detects that an object has approached, thereby preventing the electronic device 1 from malfunctioning. The operation of the electronic device 1 will now be described.

FIG. 14 is a flowchart showing the operation of the electronic device 1 when turning off the function of the touch panel 130 in the case where the receiver 200 outputs the sound. The processes shown in FIG. 14 and FIGS. 15 to 18 are enabled by the CPU 101 of the controller 100 executing the main program (control program) 104 in the storage module 103.

As shown in FIG. 14, in Step s1, when the user performs, for example, a predetermined manipulation on the display module 2*a* of the cover panel 2 so that an instruction to execute a predetermined sound output application is input to the electronic device 1, the controller 100 reads the sound output application from the storage module 103 and starts to execute the sound output application. As a result, the electronic device 1 starts to execute the function corresponding to the sound output application.

Next, in Step s2, the user manipulates the display module 2*a* of the cover panel 2 to input a sound output starting instruction to the electronic device 1. Then, in Step s3, the controller 100 checks the sound output source when performing sound output, that is, checks the sound output means to be used. In the case where, for example, the music playback application, the stored moving image playback application, or the voice recorder application is executed in Step s2, the user manipulates a playback button displayed on the display module 2*a*, so that a sound output starting instruction is input to the electronic device 1.

The instruction to execute a sound output application in Step s1 and the sound output starting instruction in Step s2 may be input to the electronic device 1 through the same manipulation on the display module 2*a* by the user. For example, for the voice conversation application, the conversation button displayed on the display module 2*a* is manipulated by the user, so that an instruction to execute a voice conversation application and the sound output starting instruction are input to the electronic device 1.

In the electronic device 1 according to this embodiment, in the case where an earphone is connected to the earphone terminal 50, the sound output source is the earphone output module 230 irrespective of the type of the sound output application being executed. In the electronic device 1, the controller 100 is notified of whether or not an earphone is connected to the earphone terminal 50.

In the electronic device 1, in the case where an earphone is not connected to the earphone terminal 50 and the near-field wireless communication module 240 is set to be used as the sound output means in the sound output application being executed, the sound output source is the near-field wireless communication module 240. The user manipulates the display module 2a of the cover panel 2 so as to set whether or not to use the near-field wireless communication module 240 per sound output application while the sound output application is being executed.

In the electronic device 1, in the case where an earphone is not connected to the earphone terminal 50 and the near-field wireless communication module 240 is set not to be used as the sound output means in the sound output application being executed, the sound output source varies depending on the type of the sound output application being executed. Hereinafter, the "state where an earphone and near-field radio are set not to be used" refers to the state where in the electronic device 1, an earphone is not connected to the earphone terminal 50 and the near-field wireless communication module 240 is set not to be used as the sound output means in the sound output application being executed.

In this embodiment, when the electronic device 1 is in the state where an earphone and near-field radio are set not to be used while the music playback application, the videophone application, the stored moving image playback application, and the delivered moving image playback application are being executed, the external speaker 210 serves as the sound output source.

When the electronic device 1 is in the state where an earphone and near-field radio are set not to be used while the voice conversation application is being executed, one of the receiver 200 and the front-side sound output module 220, which is set by the user, serves as the sound output source. The user can set, for the voice conversation application, which of the receiver 200 and the front-side sound output module 220 is used as the sound output source by manipulating the display module 2a of the cover panel 2.

When the electronic device 1 is in the state where an earphone and near-field radio are set not to be used while the voice recorder application is being executed, one of the receiver 200 and the front-side sound output module 220, which is set by the user, serves as the sound output source. The user manipulates the display module 2a of the cover panel 2 for the voice recorder application, to thereby set which of the receiver 200 and the front-side sound output module 220 is used as the sound output source.

The storage module 103 stores the sound-output-source identifying information for identifying the sound output source in the sound output application being executed. With reference to this sound-output-source identifying information, the controller 100 checks the sound output source in the sound output application currently being executed. The controller 100 appropriately updates the sound-output-source identifying information in accordance with the above-mentioned rule. For example, in the case where an earphone is connected to the earphone terminal 50 while executing the voice conversation application, the controller 100 sets the information for identifying the earphone output module 230 as the sound-output-source identifying information. In the case where the electronic device 1 is in the state where an earphone and near-field radio are set not to be used and also in the case where the use of the front-side sound output module 220 is set by the user, the controller 100 sets the information for identifying the front-side sound output module 220 as the sound-output-source identifying information.

As a result of checking the sound output source in Step s3, when judging that the sound output source is the receiver 200 in Step s4, in Step s5, the controller 100 causes the receiver 200 to start outputting sound and turns on, that is, enables the function of the proximity sensor 150. As a result, while the voice conversation application is being executed, the receiver 200 starts to output the sound included in the received signal received from the communication partner device by the wireless communication module 110. While the voice recorder application is being executed, meanwhile, the receiver 200 starts to output the sound included in the recorded data in the storage module 103.

The electronic device 1 according to this embodiment is provided with a power supply control switch for proximity sensor for controlling a power supply to the proximity sensor 150. The controller 100 changes the power supply control switch for proximity sensor from ON to OFF, thus supplying power to the proximity sensor 150. This turns on (enables) the function of the proximity sensor 150, so that the proximity sensor 150 can detect that an object has approached. The function of the proximity sensor 150, which is normally turned off (disabled), is turned on (enabled) as required as described above.

After Step s5, in Step s6, the proximity sensor 150 detects that an object has approached the receiver hole 60 and then outputs a detection signal. Then, in Step s7, the controller 100 turns off the function of the touch panel 130 and also turns off a display of the display panel 120. In other words, the controller 100 disables the function of the touch panel 130 and also stops a display of the display panel 120. In this embodiment, a power supply control switch for touch panel is provided, which controls a power supply to the touch panel 130. The controller 100 changes the power supply control switch for touch panel from ON to OFF, thus stopping a power supply to the touch panel 130. As a result, the function of the touch panel 130 is turned off (disabled), so that the touch panel 130 will not detect the contact of an object with the display module 2a. The controller 100 turns off, for example, the backlight of the display panel 120 to turn off (stop) a display of the display panel 120. This prevents the display module 2a from displaying information.

As described above, in the case of causing the receiver 200 to output the sound, the controller 100 turns off the function of the touch panel 130 when the proximity sensor 150 detects that an object has approached. This prevents a situation in which even if the ear, cheek, or the like of the user comes into contact with the display module 2a when the user brings his/her ear near the receiver hole 60 to listen to the sound output through the receiver hole 60, the touch panel 130 detects the contact. Thus, the electronic device 1 can be prevented from malfunctioning. The display of the display panel 120 is also turned off when the function of the touch panel 130 is turned off, reducing the power consumption of the electronic device 1.

After Step s7 is performed, when the proximity sensor 150 does not detect that an object has approached while the receiver 200 is outputting the sound, that is, when the proximity sensor 150 outputs no detection signal, the controller 100 turns on the function of the touch panel 130 and also turns on a display of the display panel 120. In other words, the controller 100 enables the function of the touch panel 130 and also starts a display of the display panel 120. In the case where the user takes his/her ear off the cover panel 2 while the receiver 200 is outputting the sound, accordingly, the function of the touch panel 130 is turned on (enabled) and a display of the display panel 120 is turned on (started). Thus, the user manipulates the display module 2a while watching the display of the display module 2a while the receiver 200 is outputting the sound, to thereby input an instruction to the electronic device 1. For example, the user can manipulate the display module 2a to change the volume of the receiver volume. The controller 100 changes the power supply control switch for touch panel from OFF to ON to restart a power supply to the touch panel 130, thereby turning on the function of the touch panel 130. The controller 100 turns on the backlight of the display panel 120 to turn on a display of the display panel 120.

After that, when the user again brings his/her ear near the receiver hole 60 to listen to the sound from the receiver 200, Step s6 described above is performed, so that the proximity sensor 150 detects that an object has approached. Step s7 is accordingly performed, so that the function of the touch panel 130 is turned off and a display of the display panel 120 is turned off.

A sound output stop instruction is input to the electronic device 1 by the user whose ear is apart from the cover panel 2 while the receiver 200 is outputting the sound, whereby the controller 100 stops a sound output from the receiver 200 and also turns off the function of the proximity sensor 150. The user performs a predetermined manipulation on the display module 2a of the cover panel 2, so that the sound output stop instruction is input to the electronic device 1. For example, while the voice recorder application is being executed, the sound output stop instruction is input to the electronic device 1 through the manipulation made on the playback stop button displayed on the display module 2a during the playback of the recorded data. The controller 100 changes the power supply control switch for proximity sensor from ON to OFF to stop a power supply to the proximity sensor 150, thereby turning off the function of the proximity sensor 150.

In some cases, a sound output from the receiver 200 automatically ends without an instruction from the user upon, for example, the completion of the playback of the recorded sound, such as the case in which the voice recorder application is being executed. In this case, the controller 100 turns on the function of the touch panel 130, turns on a display of the display panel 120, and turns off the function of the proximity sensor 150 once the proximity sensor 150 does not detect that an object has approached after the end of the sound output from the receiver 200.

In the electronic device 1 according to this embodiment, as described above, when the user brings his/her ear near the cover panel 2 to listen to the sound output through the receiver hole 60, the function of the touch panel 130 is turned off and a display of the display panel 120 is turned off. The user takes his/her ear off the cover panel 2 while the receiver hole 60 is outputting the sound, so that the function of the touch panel 130 is returned to the on-state and the display of the display panel 120 is returned to the on-state. When the user brings his/her ear near the cover panel 2 to again listen to the sound output through the receiver hole 60 while the receiver hole 60 is outputting the sound, the function of the touch panel 130 is turned off and the display of the display panel 120 is turned off.

The electronic device 1 according to this embodiment can change the sound output source while executing a sound output application. For example, upon notification that an earphone is connected to the earphone terminal 50, the controller 100 executing the sound output application changes the sound output source to the earphone output module 230. The controller 100 executing the sound output application changes the sound output source to the near-field wireless communication module 240 in the case where no earphone is connected to the earphone terminal 50 and the user manipulates the display module 2a to set the use of the near-field wireless communication module 240 as the sound output means. In the case where the user does not set to use the near-field wireless communication module 240 as the sound output means, the earphone connected to the earphone terminal 50 is removed from the earphone terminal 50, whereby the controller 100 executing the sound output application changes the sound output source from the earphone output module 230 to the sound output means (for example, receiver 200) for use in the state where an earphone and close-range wireless radio are set not to be used. In the case where the sound output source is the receiver 200 and the electronic device 1 is in the state where an earphone and near-field radio are set not to be used, the controller 100 executing the voice conversation application changes the sound output source from the receiver 200 to the external speaker 210 upon manipulation of a hands-free switch button.

When the controller 100 executing the sound output application changes the sound output source to the receiver 200 while causing, for example, the earphone output module 230 to output the sound, the electronic device 1 performs the processes of Step s5 and the following steps described above. This prevents, even in the case where the sound output source is changed to the receiver 200 while the electronic device 1 is outputting the sound, the electronic device 1 from malfunctioning as in a similar manner.

As described above, in the use of the receiver 200 as the sound output source, the proximity sensor 150 can detect that the user's ear has approached or come into contact with the cover panel 2, allowing the function of the touch panel 130 to be turned off when the user tries to listen to the sound through the receiver hole 60.

In the use of the front-side sound output module 220 as the sound output source, meanwhile, the proximity sensor 150 may fail to detect that the user's ear has approached or come into contact with the cover panel 2. This leads to a risk that the function of the touch panel 130 may not be turned off when the user tries to listen to the sound from the cover panel 2. This risk will now be described in detail.

The receiver hole 60 is provided at the upper-end portion of the cover panel 2 such that the user holding the electronic device 1 in his/her hand can easily bring his/her ear to the receiver hole 60 (see FIGS. 1 and 2). The proximity sensor 150 is positioned on the rear side of the upper end portion of the cover panel 2, when the electronic device 1 is viewed from the front side, so as to detect that the user has approached his/her ear near the receiver hole 60 to listen to the sound through the receiver hole 60.

As described above, the proximity sensor 150 is disposed to detect that an object (user's ear) has approached the receiver hole 60 provided at the upper-end portion of the cover panel 2. In this embodiment, for this reason, even when the user brings his/her ear near or into contact with the lower-end portion of the cover panel 2, the proximity sensor

150 may fail to detect this. Sound (air conducted sound and conduction sound) occurs from the entire cover panel 2 in the front-side sound output module 220. Thus, the user may bring his/her ear near or into contact with the lower-end portion of the cover panel 2, which is located apart from the proximity sensor 150, to listen to the sound from the cover panel 2. In this case, the proximity sensor 150 may output no detection signal. In the case where the sound output source is the front-side sound output module 220 and the controller 100 operates as in the case where the sound output source is the receiver 200, accordingly, the function of the touch panel 130 may not to be turned off when the user tries to listen to the sound from the cover panel 2, which may cause a malfunction of the electronic device 1.

Figure 15:
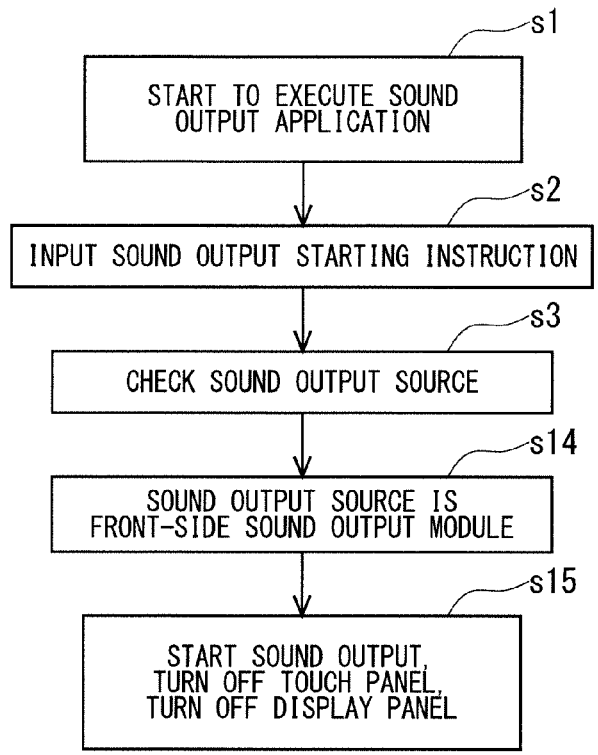
FIG. 15 is a flowchart showing an operation of the electronic device.

In this embodiment, therefore, in the case where the sound output source is the front-side sound output module 220, the controller 100 performs the process differently from the case in which the sound output source is the receiver 200, thus reliably preventing the electronic device 1 from malfunctioning. Described now is the operation of the electronic device 1 in turning off the function of the touch panel 130 when the front-side sound output module 220 outputs the sound. FIG. 15 is a flowchart showing this operation.

As shown in FIG. 15, Step s1 described above is performed so that the execution of the sound output application is started, and then, Step s2 described above is executed so that the user inputs a sound output starting instruction to the electronic device 1. Then, Step s3 described above is performed so that the controller 100 checks the sound output source.

After checking the sound output source, in Step s14, the controller 100 judges that the sound output source is the front-side sound output module 220. Then, in Step s15, the controller 100 causes the front-side sound output module 220 to start a sound output, turns off the function of the touch panel 130, and turns off a display of the display panel 120. In other words, the controller 100 starts to vibrate the piezoelectric vibration element 221 based on a sound signal and also turns off the function of the touch panel 130 and the display of the display panel 120. In this case, the function of the proximity sensor 150 is kept being turned off.

In the electronic device 1 according to this embodiment, as described above, the controller 100 turns off the function of the touch panel 130 when causing the front-side sound output module 220 to start outputting sound, that is, starts to vibrate the piezoelectric vibration element 221 based on a sound signal. This allows the function of the touch panel 130 to be turned off before the user brings his/her ear near or into contact with the cover panel 2 to listen to the sound from the cover panel 2. Therefore, the electronic device 1 can be prevented from malfunctioning due to the action of the touch panel 130 when the user tries to listen to the sound from the cover panel 2.

Figure 16:
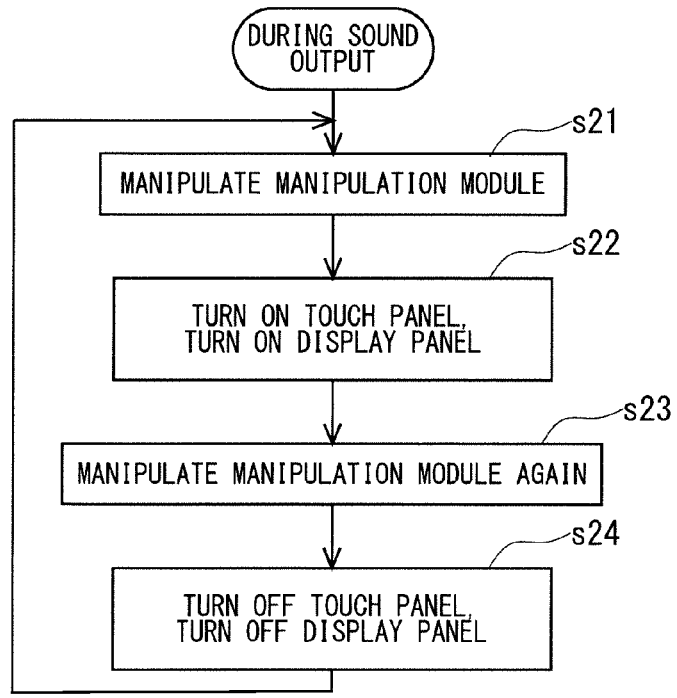
FIG. 16 is a flowchart showing an operation of the electronic device.

In this embodiment, as described above, in the case where the sound output source is the front-side sound output module 220, the function of the touch panel 130 is not automatically turned on even if the user takes his/her ear off the cover panel 2 while the front-side sound output module 220 is outputting the sound (while the piezoelectric vibration element 221 is being vibrated based on a sound signal) because the function of the proximity sensor 150 is turned off. In this embodiment, accordingly, the function of the touch panel 130 is returned to the on-state upon manipulation of the manipulation module 140 while the front-side sound output module 220 is outputting sound, that is, while the controller 100 is controlling the piezoelectric vibration element 221 based on a sound signal. FIG. 16 is a flowchart showing the operation of the electronic device 1 upon manipulation of the manipulation module 140 while the front-side sound output module 220 is outputting the sound.

As shown in FIG. 16, in Step s21, the user presses any one of a plurality of hardware keys 141 included in the manipulation module 140 while the controller 100 executing the sound output application is causing the front-side sound output module 220 to output the sound. Then, in Step s22, the controller 100 returns the function of the touch panel 130 to the on-state and also returns the display of the display panel 120 to the on-state. As a result, when the user takes his/her ear off the cover panel 2 to manipulate the manipulation module 140 while the cover panel 2 is outputting the sound, the function of the touch panel 130 is turned on and the display of the display panel 120 is turned on. Thus, the user manipulates the display module 2a while watching the display of the display module 2a during the generation of the sound from the cover panel 2, thereby inputting an instruction to the electronic device 1.

After that, in Step s23, the user again manipulates the manipulation module 140, specifically, the user presses any one of a plurality of hardware keys 141 included in the manipulation module 140. Then, in Step s24, the controller 100 again turns off the function of the touch panel 130 and again turns off the display of the display panel 120. This prevents the electronic device 1 from malfunctioning due to the action of the touch panel 130 when the user brings his/her ear near or into contact with the cover panel 2 to listen to the sound from the cover panel 2.

After that, Step s21 is performed so that the manipulation module 140 is manipulated again. Then, Step s22 is performed so that the function of the touch panel 130 is turned on and the display of the display panel 120 is turned on. The electronic device 1 then operates in a similar manner.

The user, who has taken his/her ear from the cover panel 2 and manipulated the manipulation module 140 during the sound output from the front-side sound output module 220, performs a predetermined manipulation on the display module 2a of the cover panel 2, so that the user inputs a sound output end instruction to the electronic device 1. The controller 100 accordingly stops a sound output from the front-side sound output module 220. In other words, the controller 100 stops to vibrate the piezoelectric vibration element 221.

In the case where a sound output from the front-side sound output module 220 automatically ends without an instruction from the user because, for example, the playback of the recorded sound is finished, as in the case in which the voice recorder application is being executed, the user manipulates the manipulation module 140 after the sound output from the front-side sound output module 220 ends, so that the controller 100 turns on the function of the touch panel 130 and also turns on the display of the display panel 120.

Figure 17:
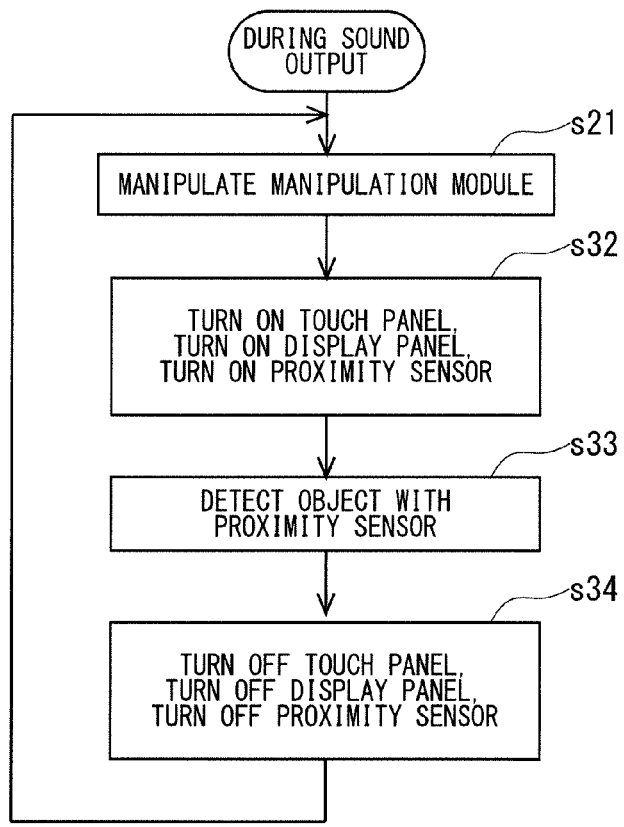
FIG. 17 is a flowchart showing an operation of the electronic device.
Figure 18:
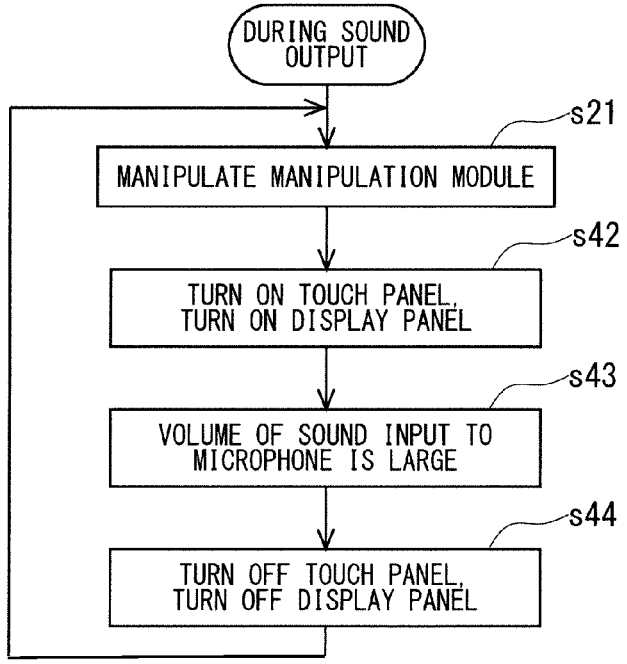
FIG. 18 is a flowchart showing an operation of the electronic device.

In the example above, the manipulation module 140 is manipulated so that the function of the touch panel 130 and a display of the display panel 120 are returned to the on-state, and then, the manipulation module 140 is manipulated again, which turns off the function of the touch panel 130 and the display of the display panel 120. Alternatively, the function of the touch panel 130 and the display of the display panel 120 may be turned off by another method. FIGS. 17 and 18 are flowcharts each showing the modification of the process shown in FIG. 16.

In the example of FIG. 17, Step s21 described above is performed so that the manipulation module 140 is manipulated while the front-side sound output module 220 is outputting the sound. Then, in Step s32, the controller 100 returns the function of the touch panel 130 and the display of the display panel 120 to the on-state and also turns on the function of the proximity sensor 150. After that, in Step s33, the proximity sensor 150 detects that an object has approached, and then, in Step s34, the controller 100 turns off the function of the touch panel 130, the display of the display panel 120, and the function of the proximity sensor 150.

After that, Step s21 is performed so that the manipulation module 140 is manipulated again. Then, Step s32 is performed so that the function of the touch panel 130, a display of the display panel 120, and the function of the proximity sensor 150 are turned on. The electronic device 1 then operates as in a similar manner.

In the example of FIG. 17, as described above, the proximity sensor 150 is used to detect that the user's ear has approached the cover panel 2 after the function of the touch panel 130 and the display of the display panel 120 are returned to the on-state. Although the proximity sensor 150 according to this embodiment may fail to detect the user's ear, which is brought near the lower-end portion of the cover panel 2, it can detect the ear, which is brought near the other part of the cover panel 2. This somewhat prevents the electronic device 1 from malfunctioning due to the action of the touch panel 130 when the user again tries to listen to the sound from the cover panel 2.

Shown in FIG. 18 is the process example in the case where the electronic device 1 holds a conversation such as voice conversation or videophone communication, namely, the case where the controller 100 is executing the voice conversation application or videophone application. As shown in FIG. 18, when Step s21 described above is performed so that the manipulation module 140 is manipulated while the front-side sound output module 220 is outputting the sound. Then, in Step s42, the controller 100 returns the function of the touch panel 130 and the display of the display panel 120 to the on-state. After that, in Step s43, the volume of the sound input to the microphone 190 exceeds a threshold, and then, in Step s44, the controller 100 turns off the function of the touch panel 130 and the display of the display panel 120.

After that, Step s21 is performed so that the manipulation module 140 is manipulated again. Then, Step s42 is performed so that the function of the touch panel 130 and the display of the display panel 120 are turned on. After that, the electronic device 1 operates in a similar manner.

In the example of FIG. 18, as described above, in the case where the piezoelectric vibration element 221 is vibrated based on a sound signal during the conversation of the electronic device 1, the function of the touch panel 130 and the display of the display panel 120 are turned off based on the volume of the sound input to the microphone 190 after the function of the touch panel 130 and the display of the display panel 120 are turned on. When the user holding a conversation with the electronic device 1 interrupts the conversation with his/her ear being taken off the cover panel 2 and then restarts the conversation with his/her ear being brought near the cover panel 2, the volume of the sound input to the microphone 190 increases. Thus, when the volume of the sound input to the microphone 190 exceeds a threshold after the function of the touch panel 130 and the display of the display panel 120 are returned to the on-state, the function of the touch panel 130 and the display of the display panel 120 are turned off, preventing the electronic device 1 from malfunctioning due to the action of the touch panel 130 when the user restarts a conversation.

The processes of FIGS. 16 to 18 may be used in combination. In other words, after the function of the touch panel 130 and the display of the display panel 120 are returned, the function of the touch panel 130 and the display of the display panel 120 may be turned off upon generation of any one of the manipulation module 140 is being manipulated again, the proximity sensor 150 detecting that an object has approached, and the sound input to the microphone 190 exceeding a threshold.

In this embodiment, as described above, the function of the touch panel 130 is turned off when the front-side sound output module 220 starts a sound output, that is, when the piezoelectric vibration element 221 starts to be vibrated based on a sound signal, thus preventing the electronic device 1 from malfunctioning due to the operation of the touch panel 130 when the user brings his/her ear near or into contact with the cover panel 2.

In this embodiment, the display of the display panel 120 is also turned off when the function of the touch panel 130 is turned off, reducing the power consumption of the electronic device 1. It is not always necessary to turn off the display of the display panel 120 when the function of the touch panel 130 is turned off.

In this embodiment, upon manipulation of the manipulation module 140 including at least one hardware key 141, the function of the touch panel 130 is returned to the on-state, allowing the function of the touch panel 130 to be readily returned to the on-state.

In the example above, the receiver 200 and the front-side sound output module 220 are provided as the sound output means capable of outputting the received sound, namely, as the sound output means capable of outputting the sound large enough to be heard in the case where, for example, the user brings his/her ear near or into contact with the electronic device 1. Alternatively, the receiver 200 may not be provided. In this case, the receiver hole 60 becomes unnecessary. In the case where the receiver hole 60 is not made in the cover panel 2, the piezoelectric vibration element 221 may be disposed in the center portion in the horizontal direction (short-side direction perpendicular to the long-side direction) of the upper-side end portion 21a of the inner main surface 21 of the cover panel 2. In this case, the piezoelectric vibration element 221 is desirably disposed in the center portion of the upper-side end portion 21a such that the center in the long-side direction thereof coincides with the center in the horizontal direction of the upper-side end portion 21a of the inner main surface 21 of the cover panel 2. As shown in FIGS. 9 and 10 described above, the piezoelectric vibration element 221 that produces flexural vibrations has the largest displacement amount at the center in the long-side direction thereof. Thus, disposing the piezoelectric vibration element 221 at the upper-side end portion 21a such that the center in the long-side direction thereof coincides with the center in the horizontal direction of the upper-side end portion 21a of the inner main surface 21 of the cover panel 2 allows the part of the piezoelectric vibration element 221, which has the largest displacement amount of flexural vibrations, to coincide with the center in the horizontal direction of the upper-side end portion 21a of the inner main surface 21 of the cover panel 2. The proximity sensor 150 may not be provided in the case where the electronic device 1 is not provided with the receiver 200.

In the example above, the controller 100 returns the function of the touch panel 130 and the display of the display panel 120 to the on-state upon manipulation of the manipulation module 140 during the use of the front-side sound output module 220. Alternatively, the function of the touch panel 130 and the display of the display panel 120 may be returned to the on-state based on an output signal from the acceleration sensor 160. For example, the controller 100 judges, based on an output signal from the acceleration sensor 160, whether or not the user has performed a predetermined vibration manipulation on the electronic device 1. Then, when judging that the user has performed the predetermined vibration manipulation on the electronic device 1, the controller 100 returns the function of the touch panel 130 and the display of the display panel 120 to the on-state. Examples of the predetermined vibration manipulation include the manipulation of vertically shaking the electronic device 1 or horizontally shaking the electronic device 1.

Although the examples above have been given of the case where the embodiments of the present disclosure are applied to a mobile phone, the embodiments of the present disclosure are also applicable to electronic devices other than mobile phones.

The electronic device 1 has been described in detail, but the above-mentioned description is illustrative in all aspects and the embodiments of the present disclosure are not intended to be limited thereto. The examples described above are applicable in combination as long as they do not contradict each other. Various modifications not exemplified are construed to be made without departing from the scope of the present disclosure.

DESCRIPTION OF REFERENCE SIGNS 1 electronic device
2 cover panel
100 controller
104 main program
120 display panel
130 touch panel
150 proximity sensor
190 microphone
200 receiver
221 piezoelectric vibration element

The invention claimed is:
1. An electronic device comprising:
a display;
a touch panel;
a piezoelectric vibration element configured to vibrate a cover panel located on a front surface of said electronic device; and
at least one processor configured to
control said display and said touch panel,
vibrate said piezoelectric vibration element based on a sound signal,
upon initiation of the vibration of said piezoelectric vibration element, disable a function of said touch panel, and,
when sound is output through an earphone connected to said electronic device, not disable the function of said touch panel.
2. The electronic device according to claim 1, wherein said at least one processor, upon initiation of the vibration of said piezoelectric vibration element, also stops a display of said display in addition to disabling the function of said touch panel.
3. The electronic device according to claim 1, further comprising at least one hardware key, wherein said at least one processor:

upon initiation of the vibration of said piezoelectric vibration element, performs a display of information on the display while disabling the function of the touch panel, and
upon manipulation of said at least one hardware key after the function of said touch panel has been disabled, enables the function of said touch panel.
4. The electronic device according to claim 3, wherein, while vibrating said piezoelectric vibration element based on the sound signal and performing the display of information on the display, said at least one processor enables the function of said touch panel upon said at least one hardware key being manipulated after the function of said touch panel has been disabled, and then, disables the function of said touch panel again upon said at least one hardware key being manipulated again.
5. The electronic device according to claim 1, further comprising:
at least one hardware key; and
a microphone,
wherein, while vibrating said piezoelectric vibration element based on the sound signal during a conversation via said electronic device, said at least one processor enables the function of said touch panel upon said at least one hardware key being manipulated after the function of said touch panel has been disabled, and then, disables the function of said touch panel again upon a volume of a sound input to said microphone exceeding a threshold.
6. The electronic device according to claim 1, further comprising:
at least one hardware key; and
a proximity sensor,
wherein, while vibrating said piezoelectric vibration element based on the sound signal and after disabling the function of said touch panel, said at least one processor, upon manipulation of said at least one hardware key, enables the function of said touch panel and also enables a function of said proximity sensor, and then, disables the function of said touch panel again upon said proximity sensor detecting proximity of an object.
7. The electronic device according to claim 1, further comprising:
a receiver configured to be controlled by said controller and outputs sound through a receiver hole located at an end portion of said cover panel; and
a proximity sensor that detects that an object has approached said receiver hole,
wherein said at least one processor enables a function of said proximity sensor when starting to cause said receiver to output sound and disables the function of said touch panel upon said proximity sensor detecting that an object has approached said receiver hole.
8. The electronic device according to claim 1, wherein said piezoelectric vibration element vibrates said cover panel such that air conducted sound and conduction sound are transmitted to a user from said cover panel.
9. A non-transitory computer-readable recording medium configured to store a control program for controlling an electronic device,
said electronic device including a display, a touch panel, and a piezoelectric vibration element configured to vibrate a cover panel located on a front surface of said electronic device,
said recording medium storing said control program which causes said electronic device to, upon initiation of vibration of the piezoelectric vibration element based on a sound signal, disable a function of said touch panel, and, when sound is output through an earphone connected to said electronic device, not disable the function of said touch panel.

10. A method for controlling an electronic device, said electronic device including a display, a touch panel, and a piezoelectric vibration element configured to vibrate a cover panel located on a front surface of said electronic device, the method comprising:

upon initiation of vibration of the piezoelectric vibration element based on a sound signal, disabling a function of said touch panel; and, when sound is output through an earphone connected to said electronic device, not disabling the function of said touch panel.

11. The electronic device according to claim 1, further comprising an acceleration sensor, wherein, while vibrating said piezoelectric vibration element based on the sound signal and after disabling the function of said touch panel, said at least one processor enables the function of said touch panel upon determining that a predetermined vibration manipulation has been performed on said electronic device based on an output signal of said acceleration sensor.

* * * * *